3,047,501
RADIATION RESISTANT MINERAL OIL
COMPOSITION
James Harold Thurston Brook, Rock Ferry, and Roy
William Glazebrook, Upton, England, assignors to
Shell Oil Company, a corporation of Delaware
No Drawing. Filed July 24, 1958, Ser. No. 750,575
Claims priority, application Great Britain Aug. 16, 1957
12 Claims. (Cl. 252—45)

This invention relates to oleaginous compositions having increased stability towards free radicals. More particularly, this invention relates to oils, preferably liquid hydrocarbon oils which possess oxidation and thermal stability towards ionizing radiation.

With increased development of nuclear power, unusual lubricating problems arise wherein known commercial lubricants fail to give satisfactory performance. Although the base lubricant, whether natural or synthetic, presents stability problems, it is usually the additive inhibitors which are often the deleterious factor in this field of lubrication because of their inability to resist oxidation and viscosity change accelerated by lubricants subjected to a radiation environment.

The exact mechanism by which hydrocarbon and other oils undergo thermal or photochemical decomposition, oxidation or damage by ionizing radiation is not yet fully understood, but in all these cases, it seems fairly certain that a free radical mechanism either predominates or takes an important part. It can, therefore, readily be seen that an oil which shows increased stability towards attack by free radicals will show improved properties in other respects, for example, by having increased thermal stability or increased resistance to damage caused by ionizing radiation. This latter property is of particular importance, at the present time, since with the advent of the industrial use of nuclear reactions lubricating oils and greases and organic coolants are required which are stable when exposed to such radiation.

It has now been discovered that oils and preferably liquid hydrocarbons such as those having initial boiling points of at least 100° F. and preferably above 450° F. are stabilized against attack by free radicals and ionizing radiation by addition thereto of from about 1% to about 30%, preferably from about 4% to about 15% by weight of a certain class of dihydroaromatic compounds. In general, the dihydroaromatic compound employed in accordance with the invention can be a dihydroaromatic, preferably hydrocarbon, compound having at least 3 fused rings or a dihydroaromatic compound having at least one benzene ring of a non-metallic element selected from the group VA and VIA of the periodic table having an atomic number of from 7 to 52, preferably from 7 to 16; and more preferably, an oxygen, a sulfur or a nitrogen atom in which heterocyclic compounds and the two hydrogen atoms may be either in the benzene or in the heterocyclic ring, but preferably in the heterocyclic ring. A special embodiment of the invention is the use of the dihydroaromatic compound in admixture with a chain transfer agent, the weight concentration ratio of the chain transfer agent to the dihydroaromatic compound being not greater than 2:1, whereby the effectiveness of the dihydroaromatic compound is increased even though the chain transfer agent is not effective alone.

The dihydroaromatic aromatic compound should have the two hydrogen atoms in the same ring and preferably attached to adjacent carbon atoms. Examples of suitable compounds are dihydrotricyclic aromatic hydrocarbons, such as 1,2-, 3,4-, or 9,10-dihydroanthracene or dihydrophenanthrene or alkyl, aryl, alkaryl or aralkyl substituted dihydroanthracene or dihydrophenanthrene, such as $C_{1-10}$ alkyl dihydroanthracene, e.g., 2-methyl-9,10-dihydroanthracene, 9-methyl-9,10-dihydroanthracene, 2,3- or 9,9-dimethyl, diethyl, dibutyl or dioctyl-9,10-dihydroanthracene, 2-phenyl or 9-phenyl-9,10-hydroanthracene, 1-phenyl- or 2-phenyl-3,4-dihydrophenanthrene, 9-benzyl-1,10-dihydroanthracene, dihydroretene, dihydrochrysene, dihydrotetracene, dihydrothionaphthene, dihydrocoumaranes, such as coumarane, dihydroindole, dihydroquinoline, and mixtures thereof. Dihydrophenanthrenes, especially 9,10-dihydrophenanthrene, and dihydrothionaphthene are the preferred compounds.

Oil compositions of this invention containing a minor amount of the above described dihydroaromatic compound are further improved with respect to stability towards photochemical oxidation and thermal stability by addition of a minor amount of a chain transfer agent as indicated above. The term "chain transfer agent" means a compound which will react with the free radicals produced in the oil by giving up a hydrogen atom, being itself converted into a free radical of some stability. It is desirable for such a compound to have chain transfer efficiency such that the resulting free radical shall not react indiscriminately with the hydrocarbons present in the oil, but preferably reacts with the dihydroaromatic compound added as a stabilizing agent. Such a chain transfer agent may be, for example, a mercaptan, an alkyl phenol, a thiophenol, an alkylated aromatic amine or a highly halogenated hydrocarbon.

Suitable chain transfer agents are mercaptans preferably containing more than 8 carbon atoms, such as, for example, nonyl mercaptan, decyl mercaptan and undecyl mercaptan. Especially preferred mercaptans are n-dodecyl mercaptan and t-dodecyl mercaptan. Suitable thiophenols which are chain transfer agents include both substituted and unsubstituted thiophenols such as thiophenol and the thiocresols. Alpha-thionaphthol and beta-thionaphthol are especially preferred as chain transfer agents. Suitable alkylated aromatic amines include $C_{1-18}$ alkyl aniline, such as N-methylaniline, $C_{4-8}$ alkyl naphthylamine and benzyl naphthylamine. Suitable highly halogenated hydrocarbons include chloroform, ethylene dichloride, ethylene trichloride, and the like, of which chloroform is preferred.

The oil composition according to this embodiment of the invention preferably contains between 1% and 30% by weight of chain transfer agent based on the weight of the composition and more preferably contains between 2% and 10% by weight provided always that the ratio of chain transfer agent to dihydroaromatic compound is not greater than 2:1 and is preferably from about 1:1 to about 1:10.

The oil which forms the major proportion of the oil composition of the present invention may be any kind of mineral or synthetic oil; thus, it may be a hydrocarbon oil such as gasoline, kerosine, gas oil, diesel fuel, lubricating oil or a residual fuel oil derived from petroleum. The hydrocarbon oil may be the raffinate obtained from a treatment with a selective solvent for aromatic components or if the oil is required to be especially stable to ionizing radiation it is preferably rich in aromatic components. More preferably, it has a viscosity-gravity constant greater than 0.85 and may be an aromatic extract; for example, it may be an aromatic extract obtained from an already relatively stable oil fraction such as the cycle oil from a catalytic cracking process. However, other oils may be required for other purposes and in some cases will be preferred. For example, synthetic lubricating oils, such as polymerized olefins, alkylated aromatic hydrocarbons, liquid polysiloxanes and fluorocarbons; ester-type lubricating oils, such as di(2-ethylhexyl)sebacate or adipate and dinonyl sebacate or adipate and trioctyl phosphate; and fatty oils such as castor oil may be employed.

The compositions of the invention may also contain minor proportions of other additives such as anti-oxidants, corrosion inhibitors or anti-rusting compounds, wear reducing agents, blooming agents, pour point depressants, viscosity improvers and anti-foaming agents.

Anti-oxidants which may be used comprise several types, for example, alkyl phenols such as 2,4,6-trimethyl phenol, pentaethyl phenol, 2,4-dimethyl-6-tertiary-butyl-phenol, 2,4-dimethyl-6-octyl phenol, 2,6-ditertiary-butyl-4-methyl phenol and 2,4,6-tritertiary-butyl phenol, amino phenol such as benzyl amino phenols, amines such as dibutyl phenylene diamine, diphenylamine, N-phenyl-beta-naphthylamine, N-phenyl-alpha-naphthylamine and dinaphthylamine, metal dialkyl dithiocarbamates, e.g., zinc dibutyldithiocarbamate, and dialkyl sulfides, e.g., dicetyl-monosulfide.

Examples of suitable corrosion inhibitors or anti-rusting compounds which may be used are the dicarboxylic acids having 16 or more carbon atoms in the molecule and organic compounds containing acidic radicals in close proximity to a nitrile, nitro or nitroso group, for example, alpha-cyano stearic acid.

Wear reducing agents which may be used comprise esters of phosphorus acids, such as triaryl, alkaryl or ar-alkyl phosphates, thiophosphates or phosphites and neutral aromatic sulfur compounds of relatively high boiling point, such as diaryl sulfides, diaryl disulfides, alkyl aryl disulfides, for example, diphenyl sulfide, diphenyl sulfide, dicresol sulfide, dixylenol sulfide, methyl butyl diphenol sulfide, dibenzyl sulfide and the corresponding di- and tri-sulfides.

As an example of a suitable anti-foaming agent, dimethyl silicone polymer can be mentioned. Additional ingredients may comprise oil-soluble urea or thiourea derivatives, for example urethanes, allophanates, carbazides and carbazones, polyisobutylene polymers and polymerized unsaturated esters of fatty acids and monohydric alcohols.

The present invention is illustrated by the following examples:

EXAMPLE I

In all of the following examples the agent used to produce free radicals was tertiary butyl peroxide.

A blend of an HVI base oil of viscosity 31.9 c./s. and 5% by weight of dihydrophenanthrene based on the weight of the base oil, was prepared and then 5% by weight of tertiary butyl peroxide added. The viscosity of the oil at 100° F. was then determined and the oil blend containing tertiary butyl peroxide heated to 135° C. for 25 hours. The products of decomposition of tertiary butyl peroxide, viz. acetone and tert-butanol, together with the small amount of undecomposed peroxide were removed by distilling them from the oil at low temperature. The viscosity of the oil increased due to polymerization brought about by the free radicals produced by the tertiary butyl peroxide. The percentage increase in viscosity brought about by this treatment is a measure of the damage caused by the free radicals. For the purpose of comparison the base oil alone was treated in a similar way with 5% by weight of tertiary butyl peroxide and the percentage increase in viscosity measured. The results obtained are shown in Table I.

Table I

Viscosity, c./s. at 100° F. increase
Base oil alone _____ 58
Base oil+5% weight dihydrophenanthrene _____ 36

These results showed that the oil blend containing the dihydroaromatic compound was less readily damaged by free radicals.

EXAMPLE II

A blend of medicinal white oil having a viscosity at 100° F. of 78.3 c./s. and 5% by weight of dihydrophenanthrene was treated with varying amounts of tertiary butyl peroxide for 25 hours at 135° C. The products of decomposition of tertiary butyl peroxide, viz. acetone and tert-butanol, together with the small amount of undecomposed peroxide were removed by distilling them from the oil at low temperature. The final viscosity of the blend after such treatment was measured. For the purpose of comparison a blend of the same medicinal white oil alone was treated in the same way with varying amounts of tertiary butyl peroxide and final viscosities measured. The results obtained are shown in Table II.

Table II

| Wt. of Peroxide, percent | Base oil alone, Viscosity, c./s. at 100° F. | Wt. of Peroxide, percent | Base oil+5% wt. dihydrophenanthrene, Viscosity, c./s. at 100° F. |
| --- | --- | --- | --- |
| 0 | 78.3 | 0 | 67.29 |
| 1.275 | 84.65 | 2.64 | 72.63 |
| 2.63 | 93.86 | 3.58 | 72.96 |
| 3.72 | 103.4 | 5.25 | 72.2 |
| 5.01 | 113.8 | 5.91 | 74.1 |
| 5.32 | 118.5 | | |
| 6.13 | 127.3 | | |

These results shown that polymerization brought about by free radicals produced by the tertiary butyl peroxide proceeds at a much slower rate in oils which contain a dihydroaromatic compound than in an oil which does not contain such a compound.

After the above blends containing dihydrophenanthrene had been treated with the tertiary butyl peroxide as described they were found to contain considerable quantities of phenanthrene showing that the dyhydrophenanthrene had reacted with the free radicals present with the loss of its two hydrogen atoms which would have combined with two free radicals.

EXAMPLE III

Blends of medicinal white oil having a viscosity of 100° F. of 78.3 c./s. with 5% by weight of various dihydroaromatic compounds were treated with 5% by weight of tertiary butyl peroxide at 135° C. for 25 hours as described in Example I. The percentage change in viscosity was measured and the results obtained are shown in Table III. For the purposes of comparison the medicinal white oil containing no dihydroaromatic compound was treated in the same way.

Table III

| Dihydroaromatic | Viscosity, c./s. at 100° F. increase |
| --- | --- |
| None | 47 |
| Dihydrothionaphthene | 37 |
| Dihydrophenanthrene | 10 |

These results show that medicinal white oil containing the dihydroaromatic compounds of the present invention has an increase stability towards free radicals.

EXAMPLE IV

Using an MVI base oil of viscosity 138 c./s. at 100° C., blends were prepared containing 5% by weight of various dihydroaromatic compounds and 5% by weight of various chain transfer agents. These blends were treated with 5% by weight of tertiary butyl peroxide at 135° C. for 25 hours as described in Example I and the changes in viscosity measured. For the purposes of comparison the base oil alone was treated in a similar manner. The results obtained are shown in Table IV.

*Table IV*

| Dihydroaromatic | Chain Transfer Agent | Viscosity, c./s. at 100° F., increase |
|---|---|---|
| None | None | 50 |
| Do | n-Dodecyl mercaptan | 57 |
| Dihydroanthracene | do | 41 |
| Dihydrothionaphthene | do | 45 |
| Dihydrophenanthrene | None | 42 |
| Do | n-Dodecyl mercaptan | 33 |

These results show that if dihydroaromatic compounds and chain transfer agents are added to an oil its stability towards attack by free radicals is increased. The combined effect of dihydroaromatic and chain transfer agent is greater than either of these two substances alone.

EXAMPLE V

Using medicinal white oil having a viscosity at 100° F. of 78.3 c./s. as a based oil, blends were prepared containing 5% by weight of various dihydroaromatic compounds and 1% by weight of various chain transfer agents. These blends were prepared containing 5% by weight of tertiary butyl peroxide at 135° C. for 25 hours as described in Example I. The percentage increase in viscosity was measured and the results obtained are given in Table V. For the purpose of comparison the results obtained using base oil alone and base oil containing only the dihydroaromatic compound are also given.

*Table V*

| Dihydroaromatic | Chain Transfer Agent | Viscosity, c./s. at 100° F., increase |
|---|---|---|
| None | None | 47 |
| Dihydrothionaphthene | do | 37 |
| Do | tri(tert.-butyl)phenol | 32 |

These results show that in accordance with the invention the addition of a dihydroaromatic compound increases the stability of the base oil towards free radicals and the addition of chain transfer agent as well as increases the stability still further.

Other specific compositions in accordance with the invention include the following:

EXAMPLE VI

Mineral lubricating oil containing 8% by weight 9,10-dihydrophenanthrene and 1% by weight of chloroform.

EXAMPLE VII

Mineral lubricating oil containing 6% by weight dihydrothionaphthene and 1% by weight alpha-thionaphthol.

EXAMPLE VIII

Kerosene containing 5% by weight 9,10-dihydroanthracene and 5% by weight N-methylaniline.

We claim as our invention:

1. A radiation resistant mineral oil consisting essentially of a major amount of mineral oil and from 1% to 30% of a dihydroaromatic compound selected from the group consisting of (1) a dihydroaromatic compound having 3 fused rings selected from the group consisting of dihydroanthracene, dihydrophenanthrene, and the $C_{1-10}$ alkyl derivatives thereof and (2) a dihydroaromatic compound having one benzene ring and a fused heterocyclic ring which has a single hetero atom in the ring selected from the group consisting of oxygen, sulfur and nitrogen, the heterocyclic ring being selected from the group consisting of 5 and 6 membered ring.

2. A radiation resistant mineral oil composition consisting essentially of a major amount of mineral oil and from about 1% to about 30% by weight of a dihydrotricyclic aromatic hydrocarbon selected from the group consisting of dihydroanthracene, dihydrophenanthrene and the $C_{1-10}$ alkyl derivatives thereof.

3. A radiation resistant mineral oil composition consisting essentially of a major amount of mineral oil and from about 1% to about 30% by weight of a dihydroaromatic compound having one benzene ring and a fused heterocyclic ring, the hetero atom of which is selected from the group consisting of nitrogen, oxygen and sulfur, the heterocyclic ring being selected from the group consisting of 5 and 6 membered ring.

4. A radiation resistant mineral oil composition consisting essentially of a major amount of mineral oil and from about 4% to about 15% by weight of a dihydroanthracene.

5. A radiation resistant mineral oil composition consisting essentially of a major amount of mineral oil and from about 4% to about 15% by weight of a dihydrophenanthrene.

6. A radiation resistant mineral oil composition consisting essentially of a major amount of mineral oil and from about 4% to about 15% by weight of dihydrothionaphthene.

7. The mineral oil composition of claim 1 containing a minor amount of a chain transfer agent selected from the class consisting of $C_{8-12}$ alkyl mercaptans selected from the group consisting of nonyl mercaptan, decyl mercaptan, dodecyl mercaptan, tri(tert. butyl) phenol, $C_{1-18}$ alkylated aromatic amines selected from the group consisting of $C_{1-18}$ alkyl aniline, $C_{4-8}$ alkyl naphthylamine, and benzyl naphthylamine, halogenated lower hydrocarbons selected from the group consisting of chloroform, ethylene dichloride, and ethylene trichloride, and thiophenols selected from the group consisting of thiophenol, thiocresol, alpha-thionaphthol and beta-thionaphthol, the weight concentration ratio of the chain transfer agent to the dihydroaromatic compound being not greater than 2:1.

8. The mineral oil composition of claim 4 containing a minor amount of an alkyl mercaptan wherein the weight concentration ratio of the alkyl mercaptan having from 8 to 10 carbon atoms to the dihydroanthracene is from about 1:1 to about 1:10.

9. The mineral oil composition of claim 5 containing a minor amount of an alkyl mercaptan wherein the weight concentration ratio of the alkyl mercaptan having from 8 to 10 carbon atoms to the dihydrophenanthrene is from about 1:1 to about 1:10.

10. The mineral oil composition of claim 6 containing a minor amount of tri(tert.-butyl)phenol wherein the weight concentration ratio of the tri(tert.-butyl)phenol to the dihydrothionaphthene is from about 1:1 to about 1:10.

11. A radiation resistant mineral oil composition consisting essentially of a major amount of mineral oil and from about 4% to 15% by weight of dihydrophenanthrene and from about 2% to 10% by weight of dodecyl mercaptan.

12. A radiation resistant mineral oil composition consisting essentially of a major amount of mineral oil and from about 4% to 15% by weight of dihydrothionaphthene and from about 2% to 10% by weight of tri(tert.-butyl)phenol.

(References on following page)

References Cited in the file of this patent

UNITED STATES PATENTS 1,949,896  Bjerregaard _____ Mar. 6, 1934

OTHER REFERENCES

"Summary of Available Data on Radiation Damage to Various Non-Metallic Materials," by E. L. Mincher, U.S. Atomic Energy Comm., KAPL–731, April 2, 1932, pp. 3–7.

"Summary Evaluation of Organics as Reactor Moderator-Coolants," by Bolt et al., U.S. Atomic Energy Comm., AECD–3711, March 1955, pp. 1–3 and 7.

"Kinetic Studies of Petroleum Antioxidants," by Kennerly et al., Ind. & Eng. Chem., October 1956, pp. 1917–1924.